(12) United States Patent
Takagi

(10) Patent No.: US 11,011,308 B2
(45) Date of Patent: May 18, 2021

(54) MULTILAYER CERAMIC ELECTRONIC COMPONENT

(71) Applicant: Murata Manufacturing Co., Ltd., Nagaokakyo (JP)

(72) Inventor: Yuya Takagi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 37 days.

(21) Appl. No.: 16/654,054

(22) Filed: Oct. 16, 2019

(65) Prior Publication Data

US 2020/0126724 A1 Apr. 23, 2020

(30) Foreign Application Priority Data

Oct. 22, 2018 (JP) .............................. JP2018-198423

(51) Int. Cl.
  *H01G 4/30* (2006.01)
  *H01G 4/12* (2006.01)
  *H01G 4/232* (2006.01)

(52) U.S. Cl.
  CPC ......... *H01G 4/1227* (2013.01); *H01G 4/1236* (2013.01); *H01G 4/232* (2013.01); *H01G 4/30* (2013.01)

(58) Field of Classification Search
  CPC .... H01G 4/1227; H01G 4/1236; H01G 4/232; H01G 4/30; H01G 4/012; H01G 4/12; H01G 4/224
  USPC ...................................................... 361/301.4
  See application file for complete search history.

(56) References Cited

U.S. PATENT DOCUMENTS

| 2014/0285946 | A1* | 9/2014 | Yoon ...................... | H01G 4/008 361/301.4 |
| 2014/0301015 | A1* | 10/2014 | Kim ........................ | H01G 4/30 361/301.4 |
| 2015/0340155 | A1* | 11/2015 | Fukunaga .............. | H01G 4/012 361/301.4 |
| 2015/0340156 | A1* | 11/2015 | Masunari ............... | H01G 4/008 361/301.4 |
| 2017/0018363 | A1* | 1/2017 | Tanaka .................... | H01G 4/30 |

FOREIGN PATENT DOCUMENTS

JP 2017-147429 A 8/2017

* cited by examiner

*Primary Examiner* — Sherman Ng
(74) *Attorney, Agent, or Firm* — Keating & Bennett, LLP

(57) ABSTRACT

A multilayer ceramic electronic component includes a laminated body, and first and second external electrodes respectively provided on first and second end surfaces of the laminated body. The laminated body includes an inner layer portion in which the first and second internal electrode layers oppose each other with the dielectric ceramic layers interposed therebetween, and outer layer portions sandwiching the inner layer portion in the lamination direction and a side margin portion sandwiching the inner layer portion and the outer layer portions in the width direction. The side margin portion is defined by ceramic layers laminated in the width direction, and includes, as the ceramic layers, an inner layer on an innermost side of the laminated body and an outer layer on an outermost side of the laminated body.

12 Claims, 7 Drawing Sheets

MULTILAYER CERAMIC ELECTRONIC COMPONENT

CROSS REFERENCE TO RELATED APPLICATIONS

This application claims the benefit of priority to Japanese Patent Application No. 2018-198423 filed on Oct. 22, 2018. The entire contents of this application are hereby incorporated herein by reference.

BACKGROUND OF THE INVENTION

1. Field of the Invention

The present invention relates to a multilayer ceramic electronic component.

2. Description of the Related Art

An example of a multilayer ceramic electronic component includes a multilayer ceramic capacitor. The multilayer ceramic capacitor includes a laminated body in which, for example, dielectric ceramic layers and internal electrode layers are alternately laminated, and further dielectric ceramic layers are laminated on the upper surface and the lower surface, and external electrodes formed on both end surfaces of the laminated body. Some multilayer ceramic capacitors include a ceramic layer called a side margin portion formed on the side surface in order to stop the internal electrode layer from being connected to the external electrode on the side surface of the laminated body.

For example, Japanese Patent Application Laid-Open No. 2017-147429 discloses a method of manufacturing a multilayer ceramic capacitor in which an unfired multilayer chip including a plurality of ceramic layers containing, as a main component, a first ceramic having a first average grain diameter, and laminated in a first direction, and an internal electrode disposed between the plurality of ceramic layers is prepared, a side margin portion mainly containing a second ceramic having a second average grain diameter is provided on a side surface of the multilayer chip which is directed in a second direction orthogonal to the first direction to produce an element assembly with a joint portion interposed therebetween, where the joint portion mainly contains a third ceramic having a third average grain diameter smaller than the first and second average grain diameters, and the element assembly is fired.

In the method of manufacturing a multilayer ceramic capacitor described in Japanese Patent Application Laid-Open No. 2017-147429, a multilayer chip with internal electrodes exposed on both side surfaces is prepared, and a joint portion and a side margin portion are provided on both side surfaces of the multilayer chip, so that the unfired element assembly is produced. Japanese Patent Application Laid-Open No. 2017-147429 describes, as a method of forming a joint portion and a side margin portion, a method of attaching a sheet-like side margin portion and a joint portion to the side surface of a multilayer chip, a method of coating the side surface of a multilayer chip with the side margin portion and the joint portion by applying or dipping, and a method of combining both the methods.

When firing the element assembly produced in this manner, a phenomenon called balling of the internal electrode occurs due to the liquefaction of the metal powder defining the internal electrode. In the portion where balling occurs, the end surface of the internal electrode on the side surface side of the multilayer chip may enter the inside of the end surface of the ceramic layer, and a void may generate between the end surface of the internal electrode and the joint portion. There is a concern that the moisture resistance reliability of the multilayer ceramic capacitor may be lowered by the infiltration of moisture or a plating solution to the internal electrode side from the void.

The above problem is not limited to the problem with the multilayer ceramic capacitor, but is a problem common to multilayer ceramic electronic components other than the multilayer ceramic capacitor.

SUMMARY OF THE INVENTION

Preferred embodiments of the present invention provide multilayer ceramic electronic components each having high moisture resistance reliability.

A multilayer ceramic electronic component according to a preferred embodiment of the present invention includes a laminated body including a plurality of dielectric ceramic layers laminated in a lamination direction and a plurality of pairs of first internal electrode layers and second internal electrode layers. The laminated body includes a first main surface and a second main surface opposing each other in the lamination direction, a first side surface and a second side surface opposing each other in a width direction orthogonal or substantially orthogonal to the lamination direction, and a first end surface and a second end surface opposing each other in a length direction orthogonal or substantially orthogonal to the lamination direction and the width direction. A first external electrode is provided on the first end surface of the laminated body and connected to the first internal electrode layers at the first end surface, and a second external electrode is provided on the second end surface of the laminated body and connected to the second internal electrode layers at the second end surface. The laminated body includes an inner layer portion in which the first internal electrode layers and the second internal electrode layers oppose each other with the dielectric ceramic layers interposed therebetween, an outer layer portion to sandwich the inner layer portion in the lamination direction, and a side margin portion to sandwich the inner layer portion and the outer layer portion in the width direction. The side margin portion is defined by a plurality of ceramic layers laminated in the width direction, and includes, as the ceramic layers, an inner layer disposed on an innermost side of the laminated body and an outer layer disposed on an outermost side of the laminated body. When a cross section of the laminated body in the width direction and the lamination direction is viewed at at least one side surface, end surfaces of the first internal electrode layers and end surfaces of the second internal electrode layers are positioned inside relative to end surfaces of the dielectric ceramic layers, and the inner layer is interposed between the first internal electrode layers and the second internal electrode layers adjacent in the lamination direction.

According to preferred embodiments of the present invention, it is possible to provide multilayer ceramic electronic components each having high moisture resistance reliability.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, the multilayer ceramic electronic component according to preferred embodiments of the present invention will be described in detail with reference to the drawings.

The present invention is not limited to the following configurations of preferred embodiments, but can be applied by appropriately changing the configurations within a range that does not change the gist of the present invention. Note that a combination of two or more individual preferable configurations according to preferred embodiments of the present invention described below is also within the scope of the present invention.

A multilayer ceramic capacitor will be described as an example of a preferred embodiment of the multilayer ceramic electronic component according to the present invention. The present invention can also be applied to multilayer ceramic electronic components other than the multilayer ceramic capacitor. Examples of such multilayer ceramic electronic components include an inductor, a piezoelectric element, a thermistor and the like.

Multilayer Ceramic Capacitor

Figure 1:
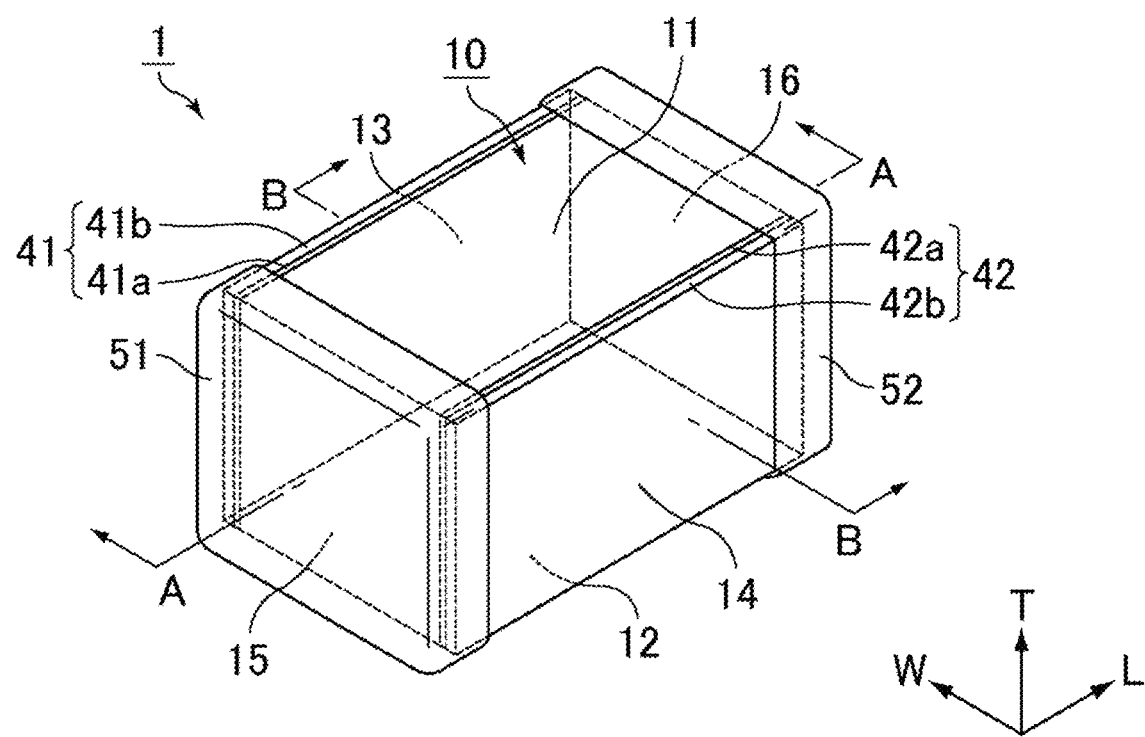
FIG. 1 is a perspective view schematically showing an example of the multilayer ceramic capacitor of a preferred embodiment of the present invention.
Figure 2:
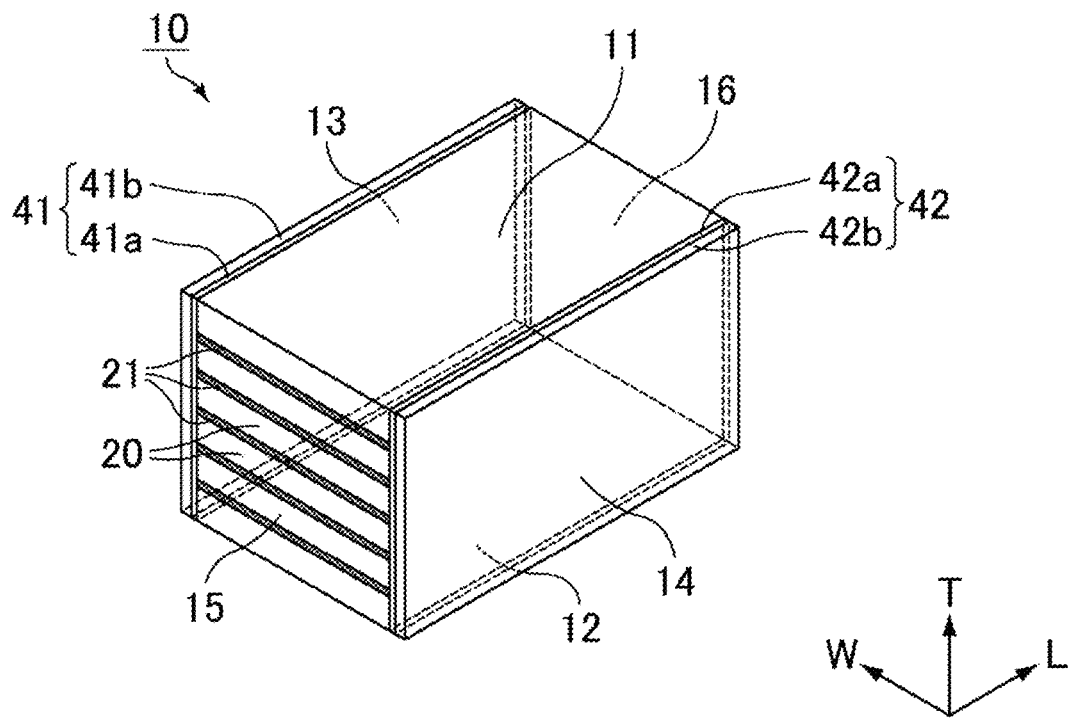
FIG. 2 is a perspective view schematically showing an example of a laminated body of the multilayer ceramic capacitor shown in FIG. 1.
Figure 3:
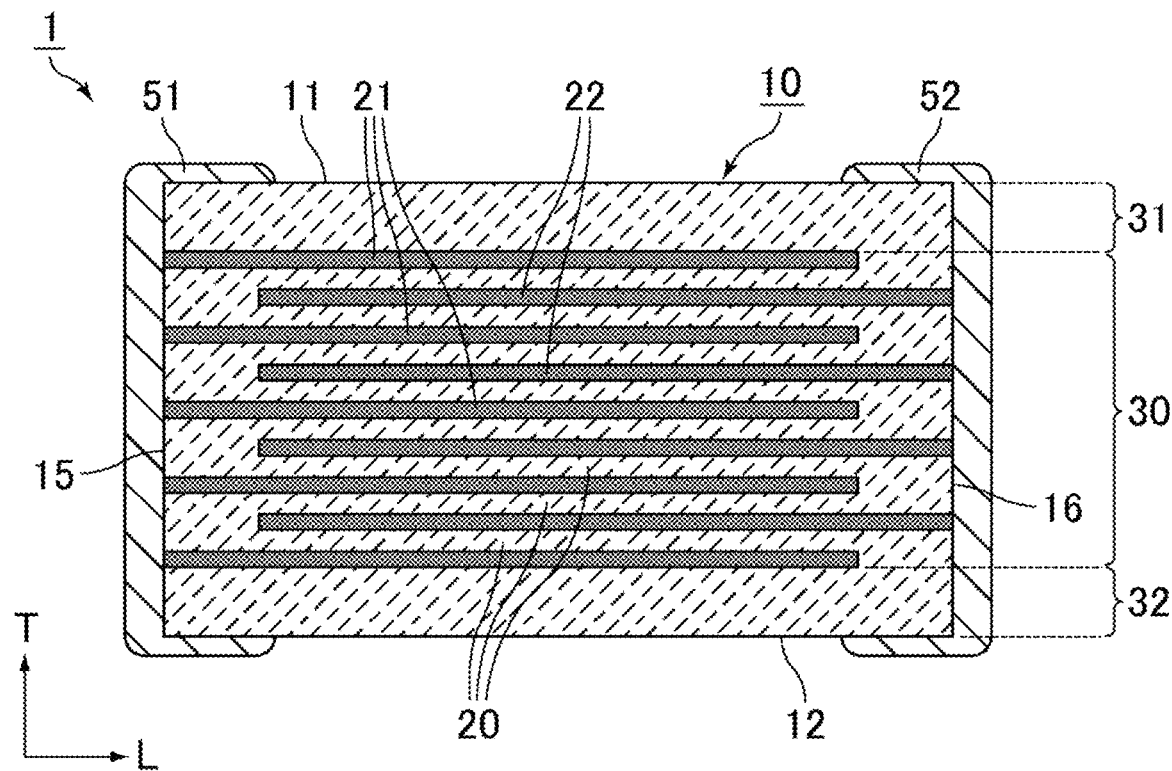
FIG. 3 is a cross-sectional view of the multilayer ceramic capacitor shown in FIG. 1, taken along line A-A.
Figure 4:
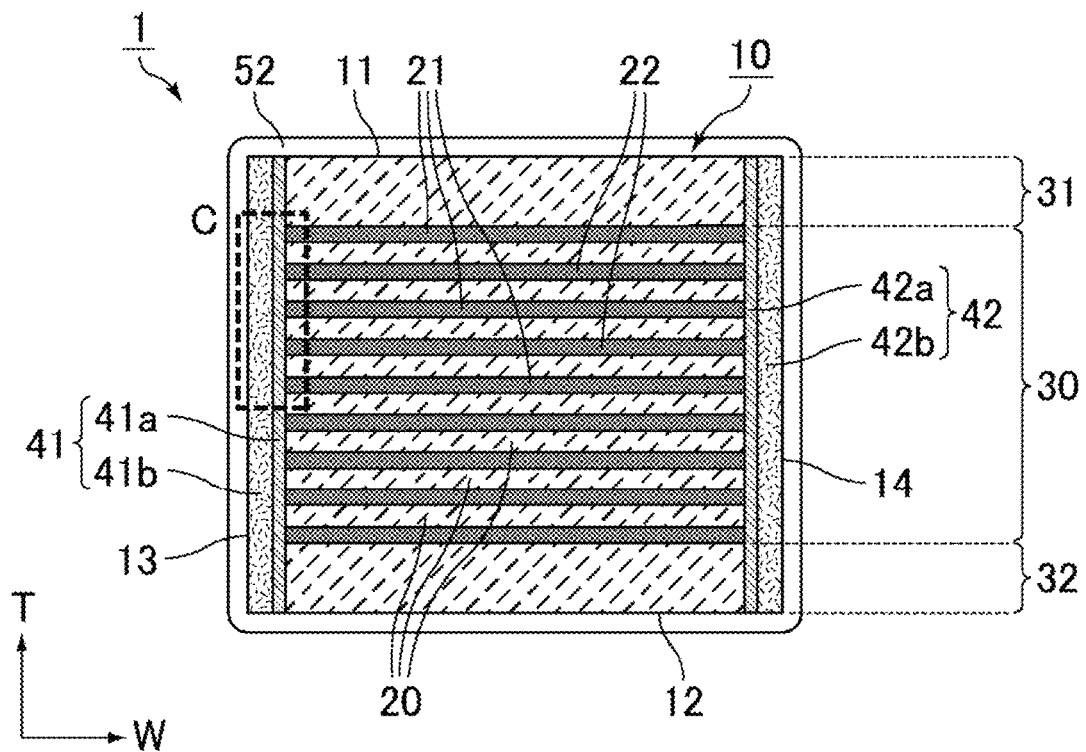
FIG. 4 is a cross-sectional view of the multilayer ceramic capacitor shown in FIG. 1, taken along line B-B.
Figure 5:
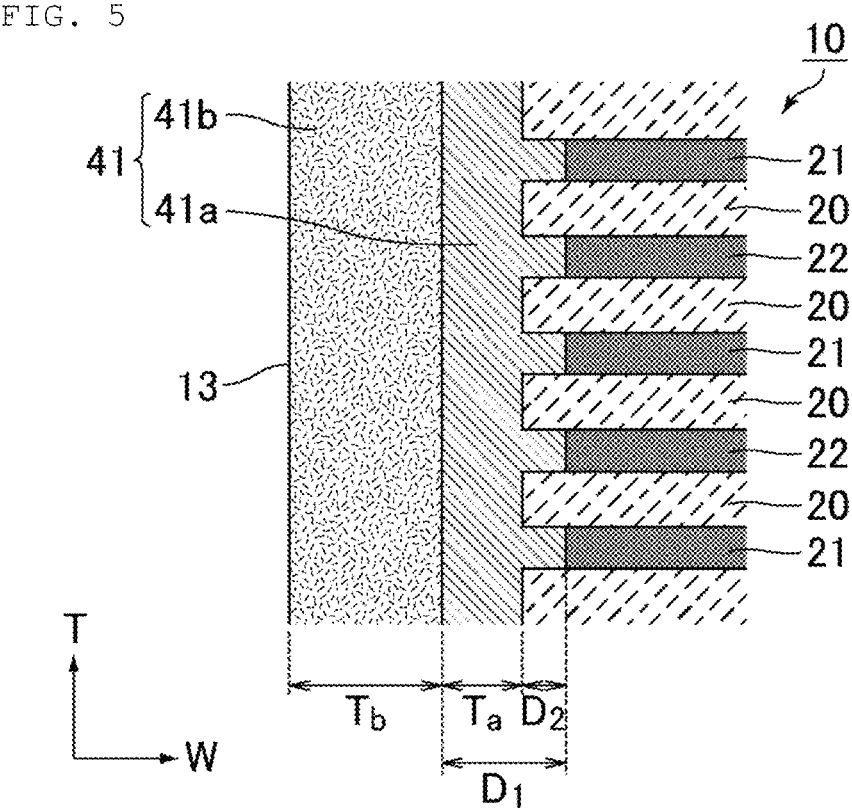
FIG. 5 is an enlarged view of a portion C of the multilayer ceramic capacitor shown in FIG. 4.

FIG. 1 is a perspective view schematically showing an example of a preferred embodiment of the multilayer ceramic capacitor according to the present invention. FIG. 2 is a perspective view schematically showing an example of a laminated body of the multilayer ceramic capacitor shown in FIG. 1. FIG. 3 is a cross-sectional view of the multilayer ceramic capacitor shown in FIG. 1, taken along line A-A. FIG. 4 is a cross-sectional view of the multilayer ceramic capacitor shown in FIG. 1, taken along line B-B. FIG. 5 is an enlarged view of a portion C of the multilayer ceramic capacitor shown in FIG. 4.

In the present specification, the lamination direction, the width direction, and the length direction of the multilayer ceramic capacitor and the laminated body are indicated by arrows T, W and L, respectively, in a multilayer ceramic capacitor 1 shown in FIG. 1 and a laminated body 10 shown in FIG. 2. Here, the lamination (T) direction, the width (W) direction, and the length (L) direction are orthogonal to each other. The lamination (T) direction is a direction in which a plurality of dielectric ceramic layers 20 and a plurality of pairs of first internal electrode layers 21 and second internal electrode layers 22 are laminated.

The multilayer ceramic capacitor 1 shown in FIG. 1 includes the laminated body 10 and a first external electrode 51 and a second external electrode 52 provided on both end surfaces of the laminated body 10.

When expressed by the dimension in the length (L) direction×the dimension in the width (W) direction×the dimension in the lamination (T) direction, the size of the multilayer ceramic capacitor 1 can be, for example, the size of about 1.6 mm× about 0.8 mm× about 0.8 mm, about 1.0 mm× about 0.5 mm× about 0.5 mm, about 0.6 mm× about 0.3 mm× about 0.3 mm, about 0.4 mm× about 0.2 mm× about 0.2 mm, about 0.2 mm× about 0.1 mm× about 0.1 mm, or approximations thereof and the like.

As shown in FIG. 2, the laminated body 10 preferably has a rectangular parallelepiped shape or a substantially rectangular parallelepiped shape, and includes a first main surface 11 and a second main surface 12 opposing each other in the lamination (T) direction, a first side surface 13 and a second side surface 14 opposing each other in the width (W) direction orthogonal or substantially orthogonal to the lamination (T) direction, and a first end surface 15 and a second end surface 16 opposing each other in the length (L) direction orthogonal or substantially orthogonal to the lamination (T) direction and the width (W) direction.

In the present specification, the cross section of the multilayer ceramic capacitor 1 or the laminated body 10 orthogonal or substantially orthogonal to the first end surface 15 and the second end surface 16 and parallel or substantially parallel to the lamination (T) direction is referred to as an LT cross section which is a cross section in the length (L) direction and in the lamination (T) direction. In addition, the cross section of the multilayer ceramic capacitor 1 or the laminated body 10 orthogonal or substantially orthogonal to the first side surface 13 and the second side surface 14 and parallel or substantially parallel to the lamination (T) direction is referred to as a WT cross section which is a cross section in the width (W) direction and the lamination (T) direction. Further, the cross section of the multilayer ceramic capacitor 1 or the laminated body 10 orthogonal or substantially orthogonal to the first side surface 13, the second side surface 14, the first end surface 15, and the second end surface 16 and orthogonal or substantially orthogonal to the lamination (T) direction is referred to as an LW cross section which is a cross section in the length (L) direction and the width (W) direction. Therefore, FIG. 3 shows the LT cross section of the multilayer ceramic capacitor 1, and FIG. 4 shows the WT cross section of the multilayer ceramic capacitor 1.

The laminated body 10 preferably includes rounded corners and ridges. The corner is a portion at which three sides of the laminated body intersect, and the ridge is a portion at which two sides of the laminated body intersect.

As shown in FIG. 2, FIG. 3, and FIG. 4, the laminated body 10 preferably includes a laminated structure including a plurality of dielectric ceramic layers 20 laminated in the lamination (T) direction, and a plurality of pairs of first internal electrode layers 21 and second internal electrode layers 22 provided along the interface between dielectric ceramic layers 20. The dielectric ceramic layer 20 extends along the width (W) direction and the length (L) direction, and each of the first internal electrode layers 21 and the second internal electrode layers 22 extends along the dielectric ceramic layer 20 in a flat plate shape.

The first internal electrode layers 21 are drawn out to the first end surface 15 of the laminated body 10. On the other hand, the second internal electrode layers 22 are drawn out to the second end surface 16 of the laminated body 10.

The first internal electrode layer 21 and the second internal electrode layer 22 oppose each other with the dielectric ceramic layer 20 interposed therebetween in the lamination (T) direction. Capacitance is generated by portions where the first internal electrode layer 21 and the second internal electrode layer 22 oppose each other with the dielectric ceramic layer 20 interposed therebetween.

Each of the first internal electrode layer 21 and the second internal electrode layer 22 preferably includes metals such as Ni, Cu, Ag, Pd, Ag—Pd alloy, and Au, for example. Each of the first internal electrode layer 21 and the second internal electrode layer 22 may preferably contain the same dielectric ceramic material as that of the dielectric ceramic layer 20 in addition to the above-described metals.

The thickness of each of the first internal electrode layer 21 and the second internal electrode layer 22 is preferably about 0.3 µm or more and about 2.0 µm or less, for example.

The first external electrode 51 is provided on the first end surface 15 of the laminated body 10, and in FIG. 1, includes a portion that extends around a portion of each of the first main surface 11, the second main surface 12, the first side surface 13, and the second side surface 14. The first external electrode 51 is connected to the first internal electrode layer 21 at the first end surface 15.

The second external electrode 52 is provided on the second end surface 16 of the laminated body 10, and in FIG. 1, includes a portion that extends around a portion of each of the first main surface 11, the second main surface 12, the first side surface 13, and the second side surface 14. The second external electrode 52 is connected to the second internal electrode layer 22 at the second end surface 16.

Each of the first external electrode 51 and the second external electrode 52 has a three-layer structure preferably including, from the end surface side of the laminated body 10, for example, a Cu-containing base electrode layer formed by baking, a first plating layer provided on the surface of the base electrode layer, and a second plating layer provided on the surface of the first plating layer.

As shown in FIGS. 3 and 4, the laminated body 10 includes an inner layer portion 30 in which the first internal electrode layers 21 and the second internal electrode layers 22 oppose each other with the dielectric ceramic layers 20 interposed therebetween, outer layer portions 31 and 32 disposed so as to sandwich the inner layer portion 30 in the lamination (T) direction, and side margin portions 41 and 42 are provided to sandwich the inner layer portion 30, the outer layer portion 31, and the outer layer portion 32 in the width (W) direction. In FIG. 3 and FIG. 4, the inner layer portion 30 is a region sandwiched by the first internal electrode layer 21 closest to the first main surface 11 and the first internal electrode layer 21 closest to the second main surface 12 along the lamination (T) direction. Although not shown, each of the outer layer portion and the outer layer portion 32 is preferably defined by a plurality of dielectric ceramic layers 20 lamination in the lamination (T) direction.

The dielectric ceramic layer 20 defining the inner layer portion 30 is preferably made of, for example, a dielectric ceramic material containing $BaTiO_3$, $CaTiO_3$, $SrTiO_3$, $CaZrO_3$, or the like as a main component.

The dielectric ceramic layer 20 defining the inner layer portion 30 may preferably further include a sintering aid element described later.

The thickness of the dielectric ceramic layer 20 defining the inner layer portion 30 is preferably about 0.2 µm or more and about 10 µm or less, for example.

The dielectric ceramic layer 20 defining the outer layer portion 31 and the outer layer portion 32 is preferably made of, for example, a dielectric ceramic material containing $BaTiO_3$, $CaTiO_3$, $SrTiO_3$, $CaZrO_3$, or the like as a main component. The dielectric ceramic layer 20 defining the outer layer portion 31 and the outer layer portion 32 may preferably further include a sintering aid element described later.

The dielectric ceramic layer 20 defining the outer layer portion 31 and the outer layer portion 32 is preferably made of the same dielectric ceramic material as that of the dielectric ceramic layer 20 defining the inner layer portion 30, but may be made of the dielectric ceramic material different from that of the dielectric ceramic layers 20 defining the inner layer portion 30.

The thickness of each of the outer layer portions 31 and 32 is preferably about 15 µm or more and about 40 µm or less, for example. Each of the outer layer portions 31 and 32 may have a single layer structure, instead of the multilayer structure.

Each of a side margin portion 41 and a side margin portion 42 includes a plurality of ceramic layers laminated in the width (W) direction. In FIG. 4, the side margin portion 41 preferably has a two-layer structure including, as the ceramic layers, an inner layer 41a disposed at the innermost side of the laminated body 10 and an outer layer 41b disposed at the outermost side of the laminated body 10. Similarly, the side margin portion 42 preferably has a two-layer structure including, as the ceramic layers, an inner layer 42a disposed at the innermost side of the laminated body 10 and an outer layer 42b disposed at the outermost side of the laminated body 10. The side margin portion is not limited to the two-layer structure including an inner layer and an outer layer as a ceramic layer, and may have a structure including three or more layers including another ceramic layer between the inner layer and the outer layer. Further, the layer number of ceramic layers may be different between the side margin portion on the first side surface side and the side margin portion on the second side surface side of the laminated body.

When the side margin portion has a two-layer structure including an inner layer and an outer layer, it is possible to validate that it has a two-layer structure from the difference in sinterability between the inner layer and the outer layer by observing it using an optical microscope or an electron microscope. The same applies to the case where the side margin portion has a structure including three or more layers.

As shown in FIG. 5, the end surfaces of the first internal electrode layers 21 and the second internal electrode layers 22 are positioned inside relative to the end surface of the dielectric ceramic layers 20 on the first side surface 13 side of the laminated body 10, and the inner layer 41a is interposed between the first internal electrode layers 21 and the second internal electrode layers 22 adjacent in the lamination (T) direction.

As a result, it is possible to reduce or prevent infiltration of moisture and plating solution from between the end surfaces of the first internal electrode layers 21 and the second internal electrode layers 22, and the inner layer 41a.

As a result, the moisture resistance reliability of the multilayer ceramic capacitor is improved.

In FIG. 5, the end surfaces of all of the first internal electrode layers 21 and the second internal electrode layers 22 are preferably positioned inside relative to the end surface of the dielectric ceramic layers 20, but there may be a first internal electrode layer 21 and a second internal electrode layer 22 including end surfaces that are not positioned inside relative to the end surface of the dielectric ceramic layer 20.

Although not shown, preferably, the end surfaces of the first internal electrode layers 21 and the second internal electrode layers 22 are positioned inside relative to the end surface of the dielectric ceramic layers 20 on the second side surface 14 side of the laminated body 10, and the inner layer 42a is interposed between the first internal electrode layers 21 and the second internal electrode layers 22 adjacent in the lamination (T) direction.

In this case, there may be a first internal electrode layer 21 and a second internal electrode layer 22 including an end surface not positioned inside relative to the end surface of the dielectric ceramic layer 20.

In the following, a case will be described in which on both side surfaces, the end surfaces of the first internal electrode layers and the second internal electrode layers are positioned inside relative to the end surfaces of the dielectric ceramic layers, and the inner layer is interposed between the first internal electrode layers and the second internal electrode layers adjacent in the lamination direction.

However, as long as on either one side surface, the end surfaces of the first internal electrode layers and the second internal electrode layers are positioned inside relative to the end surface of the dielectric ceramic layers, and the inner layer is interposed between the first internal electrode layers and the second internal electrode layers adjacent in the lamination direction, on the other side surface, the end surfaces of the first internal electrode layers and the second internal electrode layers may not be positioned inside relative to the end surface of the dielectric ceramic layers.

In the width (W) direction, the distance from the end surfaces of the first internal electrode layers 21 and the second internal electrode layers 22 to the outer layer 41b or 42b (the length represented by $D_1$ in FIG. 5) is preferably about 15 μm or less, or more preferably about 10 μm or less, for example. The distance from the end surfaces of the first internal electrode layers 21 and the second internal electrode layers 22 to the outer layer 41b or 42b is preferably about 1 μm or more, for example.

In FIG. 5, the distances from the end surfaces of all of the first internal electrode layers 21 and the second internal electrode layers 22 to the outer layer 41b are the same or substantially the same, but they may be different from each other.

In the width (W) direction, the distance from the end surfaces of the first internal electrode layers 21 and the second internal electrode layers 22 to the end surfaces of the dielectric ceramic layers 20 (the length represented by $D_2$ in FIG. 5) is preferably about 5 μm or less, more preferably about 2 μm or less, and still more preferably about 1 μm or less, for example.

In FIG. 5, the distances from the end surfaces of all of the first internal electrode layers 21 and the second internal electrode layers 22 to the end surfaces of the dielectric ceramic layers 20 are preferably the same or substantially the same, but they may be different from each other.

From the viewpoint of maintaining the shape and performance of the multilayer ceramic capacitor 1, it is preferable that the inner layer 41a excluding the portion interposed between the first internal electrode layer 21 and the second internal electrode layer 22 is thinner than the outer layer 41b. Similarly, it is preferable that the inner layer 42a excluding the portion interposed between the first internal electrode layer 21 and the second internal electrode layer 22 is thinner than the outer layer 42b.

The thickness (the length represented by $T_a$ in FIG. 5) of each of the inner layers 41a and 42a excluding the portion interposed between the first internal electrode layer 21 and the second internal electrode layer 22 is preferably about 0.1 μm or more and about 20 μm or less, for example. It is preferable that the thicknesses of the inner layers 41a and 42a excluding the portion interposed between the first internal electrode layer 21 and the second internal electrode layer 22 is the same or substantially the same with each other.

The thickness (the length represented by $T_b$ in FIG. 5) of each of the outer layers 41b and 42b is preferably about 5 μm or more and about 20 μm or less, for example. The thicknesses of the outer layers 41b and 42b are preferably the same or substantially the same with each other.

The thickness of each of the side margin portions 41 and 42 excluding the portion where the inner layer 41a or 42a is interposed between the first internal electrode layer 21 and the second internal electrode layer 22 is preferably about 5 μm or more and about 40 μm or less, and more preferably about 5 μm or more and about 20 μm or less, for example. It is preferable that the thicknesses of the side margin portions 41 and 42 excluding the portion where the inner layer 41a or 42a is interposed between the first internal electrode layer 21 and the second internal electrode layer 22 are the same or substantially the same with each other.

The thickness of each ceramic layer in the side margin portion means an average value when the thickness of each ceramic layer of the side margin portion is measured at a plurality of places along the lamination (T) direction.

Specifically, the WT cross section is exposed substantially at the center in the length (L) direction of the multilayer ceramic capacitor, and ends of the first and second internal electrode layers in the width (W) direction in the WT cross section, and either one of the side margin portions are imaged using an optical microscope or an electron microscope so that they will be within the same field of view. Three locations of an upper portion, a middle portion and a lower portion, as imaged locations, are imaged in the lamination (T) direction. At the upper, middle, and lower portions, a plurality of line segments parallel to the width (W) direction is drawn from the end of the first and second internal electrode layers in the width (W) direction toward the side surface of the laminated body, and the length of each line segment is measured. The average value of each of the upper, middle and lower portions with respect to the lengths of the measured line segments is calculated. By further averaging the respective average values, the thickness of each ceramic layer can be obtained.

The inner layer 41a and the inner layer 42a are preferably made of, for example, a dielectric ceramic material containing of $BaTiO_3$, $CaTiO_3$, $SrTiO_3$, $CaZrO_3$, or the like as a main component. The inner layer 41a and the inner layer 42a may preferably further include a sintering aid element described later.

The inner layer 41a and the inner layer 42a are preferably made of the same dielectric ceramic material as that of the dielectric ceramic layer 20 defining the inner layer portion 30, the outer layer portion 31, and the outer layer portion 32, but may be made of the dielectric ceramic material different from that of the dielectric ceramic layers 20 defining the inner layer portion 30, the outer layer portion 31 and the outer layer portion 32.

The outer layer 41b and the outer layer 42b are preferably made of, for example, a dielectric ceramic material containing $BaTiO_3$, $CaTiO_3$, $SrTiO_3$, $CaZrO_3$, or the like as a main component. The outer layer 41b and the outer layer 42b may preferably further include a sintering aid element described later.

The outer layer 41b and the outer layer 42b are preferably made of the same dielectric ceramic material as that of the inner layer 41a and the inner layer 42a, but may be made of a dielectric ceramic material different from that of the inner layer 41a and the inner layer 42a. The outer layer 41b and the outer layer 42b are preferably made of the same dielectric ceramic material as that of the dielectric ceramic layer 20 defining the inner layer portion 30, the outer layer portion 31, and the outer layer portion 32, but may be made of a dielectric ceramic material different from that of the dielectric ceramic layer 20 defining the inner layer portion 30, the outer layer portion 31, and the outer layer portion 32.

In the multilayer ceramic capacitor 1, the outer layer 41b preferably has a content of the sintering aid element larger than that of the inner layer 41a. The outer layer 42b preferably has a content of the sintering aid element larger than that of the inner layer 42a.

In this case, the sinterability of the outer layer can be made higher than that of that of the inner layer. Further, the hardness of the outer layer can be made higher than that of the inner layer. As a result, the outer layer can be made more dense.

Examples of sintering aid elements include Si, B, Li, K, Na, Mn, Mg, Ho, Ca, and V. The sintering aid element may be used alone or in a combination of two or more. When the sintering aid elements are two or more, the outer layer preferably has a content of at least one of these elements larger than that of the inner layer.

When on any one side surface, the content of the sintering aid element in the outer layer is larger than the content of the sintering aid element in the inner layer, on the other side surface, the content of the sintering aid element in the outer layer may be the same as the content of the sintering aid element in the inner layer, or may be less than the content of the sintering aid element in the inner layer.

The type of the sintering aid element included in each ceramic layer and the content thereof can be determined by performing an elemental analysis by the wavelength dispersive X-ray analysis (WDX) after the WT cross section is exposed at the approximate center of the multilayer ceramic capacitor in the length (L) direction.

The composition of the ceramic defining each ceramic layer of the side margin portion 41 may be different from the composition of the ceramic defining the dielectric ceramic layer 20. In this case, the composition of the ceramic defining at least one of the inner layer 41a and the outer layer 41b may be different from the composition of the ceramic defining the dielectric ceramic layer 20.

Similarly, the composition of the ceramic defining each ceramic layer of the side margin portion 42 may be different from the composition of the ceramic defining the dielectric ceramic layer 20. In this case, the composition of the ceramic defining at least one of the inner layer 42a and the outer layer 42b may be different from the composition of the ceramic defining the dielectric ceramic layer 20.

When the side margin portion 41 includes two layers of the inner layer 41a and the outer layer 41b, it is preferable that the average grain diameter of the ceramic grains defining the inner layer 41a is larger than the average grain diameter of the ceramic grains defining the outer layer 41b, and the average grain diameter of the ceramic grains defining the dielectric ceramic layer 20. The average grain diameter of the ceramic grains defining the outer layer 41b may be the same or about the same as or different from the average grain diameter of the ceramic grains defining the dielectric ceramic layer 20.

Similarly, when the side margin portion 42 includes two layers of the inner layer 42a and the outer layer 42b, it is preferable that the average grain diameter of the ceramic grains defining the inner layer 42a is larger than the average grain diameter of the ceramic grains defining the outer layer 42b, and the average grain diameter of the ceramic grains defining the dielectric ceramic layer 20. The average grain diameter of the ceramic grains defining the outer layer 42b may be the same or about the same as or different from the average grain diameter of the ceramic grains defining the dielectric ceramic layer 20.

When the average grain diameter of the ceramic grains defining the inner layer is larger than the average grain diameter of the ceramic grains defining the outer layer and the average grain diameter of the ceramic grains defining the dielectric ceramic layer, the number of ceramic grains in contact with the outer layer and the dielectric ceramic layer is reduced at both interfaces of the inner layer. That is, at both interfaces of the inner layer, the grain boundaries of the ceramic grains, which are likely to be the starting point when cracking and peeling of the outer layer and the dielectric ceramic layer occur, are reduced. Therefore, a good bonding state between the outer layer and the dielectric ceramic layer is maintained with the inner layer interposed therebetween.

The average grain diameter of the ceramic grains defining each ceramic layer is obtained by selecting and measuring several ceramic grains of any size from an image obtained by imaging the WT cross section of the multilayer ceramic capacitor at a predetermined magnification with a scanning electron microscope (SEM) to calculate the average value.

Specifically, the WT cross section is exposed at substantially the center of the multilayer ceramic capacitor in the length (L) direction, 15 or more ceramic grains are selected from an image obtained by imaging the dielectric ceramic layer, the inner layer, and the outer layer at each three places of thereof at a magnification of 10000 at or substantially at the center of the lamination (T) direction. The average grain diameter is obtained by measuring the grain diameter of the selected ceramic grains by the image analysis, and calculating the average value.

Method of Manufacturing Multilayer Ceramic Capacitor

Preferably, the method of producing a multilayer ceramic capacitor according to a preferred embodiment of the present invention includes preparing a green chip having a laminated structure including a plurality of dielectric ceramic layers in an unfired state and a plurality of pairs of first internal electrode layers and second internal electrode layers, the first internal electrode layers and the second internal electrode layers exposing on the first side surface and the second side surface opposing each other in the width direction orthogonal to the lamination direction, producing an unfired laminated body by forming an unfired side margin portion on the first side surface and the second side surface of the green chip, and firing the unfired laminated body, wherein producing the unfired laminated body includes forming the unfired side margin portion by applying an inner layer ceramic slurry to the first side surface and the second side surface, drying the inner layer ceramic slurry to form an unfired inner layer, and then forming an unfired outer layer on the outermost side. The unfired outer layer is preferably formed by attaching an outer layer ceramic green sheet.

Hereinafter, a non-limiting example of a method of manufacturing the multilayer ceramic capacitor 1 shown in FIG. 1 will be described.

First, a ceramic green sheet to be the dielectric ceramic layer 20 is prepared. The ceramic green sheet includes a binder, a solvent, and the like in addition to the ceramic raw material including the dielectric ceramic material described above. The ceramic green sheet is formed, for example, on a carrier film using a die coater, a gravure coater, a microgravure coater or the like.

Figure 6A:
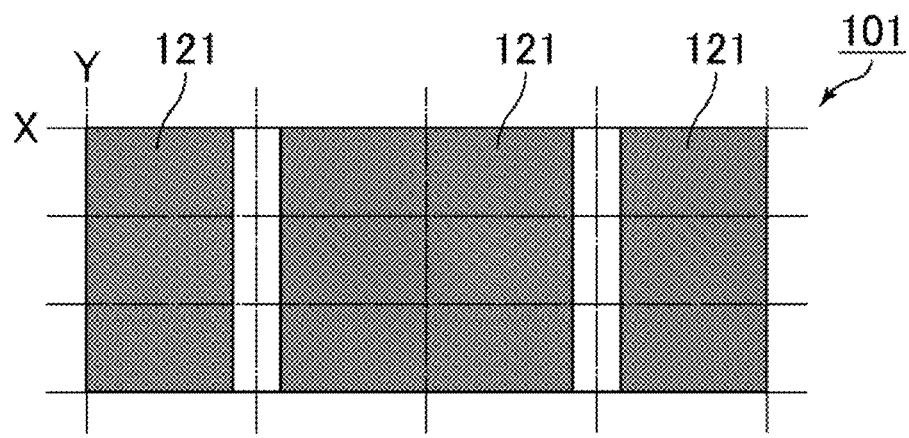
FIGS. 6A to 6C are plan views schematically showing an example of a ceramic green sheet according to a preferred embodiment of the present invention.
Figure 6B:
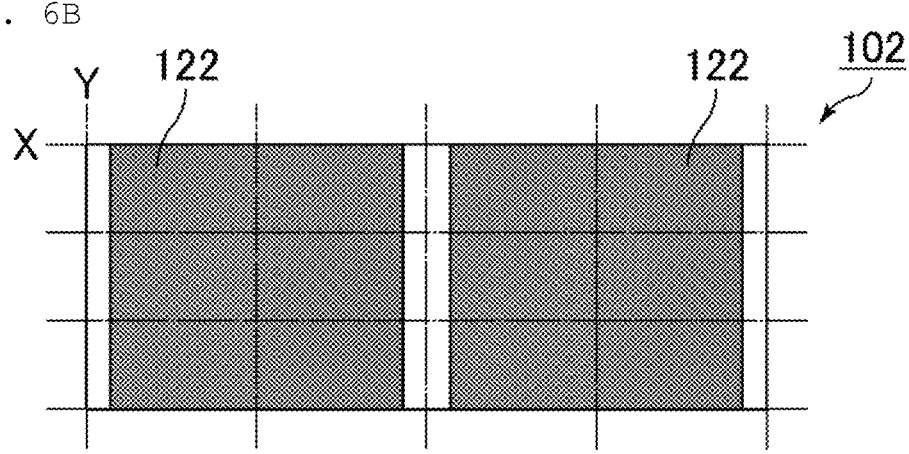
Figure 6C:
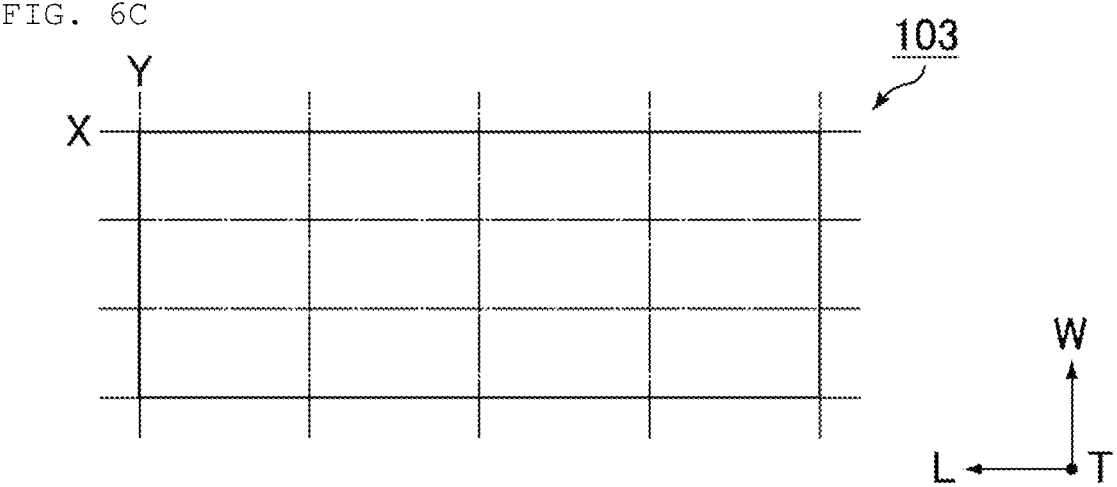

FIGS. 6A to 6C are plan views schematically showing an example of the ceramic green sheet.

FIGS. 6A to 6C each shows a first ceramic green sheet 101 for forming the inner layer portion 30, a second ceramic green sheet 102 for forming the inner layer portion 30, and a third ceramic green sheet 103 for forming the outer layer portion 31 or 32.

In FIGS. 6A to 6C, the first ceramic green sheet 101, the second ceramic green sheet 102, and the third ceramic green sheet 103 are not separated for each multilayer ceramic capacitor 1. FIGS. 6A to 6C show cutting lines X and Y at the time of cutting the multilayer ceramic capacitor 1. A cutting line X is parallel or substantially parallel to the length (L) direction, and a cutting line Y is parallel or substantially parallel to the width (W) direction.

As shown in FIG. 6A, an unfired first internal electrode layer 121 corresponding to the first internal electrode layer 21 is formed on a first ceramic green sheet 101. As shown in FIG. 6B, an unfired second internal electrode layer 122 corresponding to the second internal electrode layer 22 is formed on the second ceramic green sheet 102. As shown in FIG. 6C, the unfired internal electrode layer 121 or 122 is not formed on the third ceramic green sheet 103 corresponding to the outer layer portion 31 or 32.

The first internal electrode layer 121 and the second internal electrode layer 122 can be formed using any conductive paste. For example, a method such as a screen printing method or a gravure printing method can be used for forming the first internal electrode layer 121 and the second internal electrode layer 122 using a conductive paste.

The first internal electrode layer 121 and the second internal electrode layer 122 are disposed over two regions adjacent in the length (L) direction partitioned by the cutting line Y, and extend in a band shape in the width (W) direction. The first internal electrode layer 121 and the second internal electrode layer 122 are shifted in the length (L) direction by one row of the region partitioned by the cutting line Y. That is, the cutting line Y passing through the center or approximate center of the first internal electrode layer 121 passes through a region between the second internal electrode layer 122 and the cutting line Y passing through the center or approximate center of the second internal electrode layer 122 passes through a region between the first internal electrode layer 121.

Thereafter, the first ceramic green sheet 101, the second ceramic green sheet 102, and the third ceramic green sheet 103 are laminated to produce a mother block.

Figure 7:
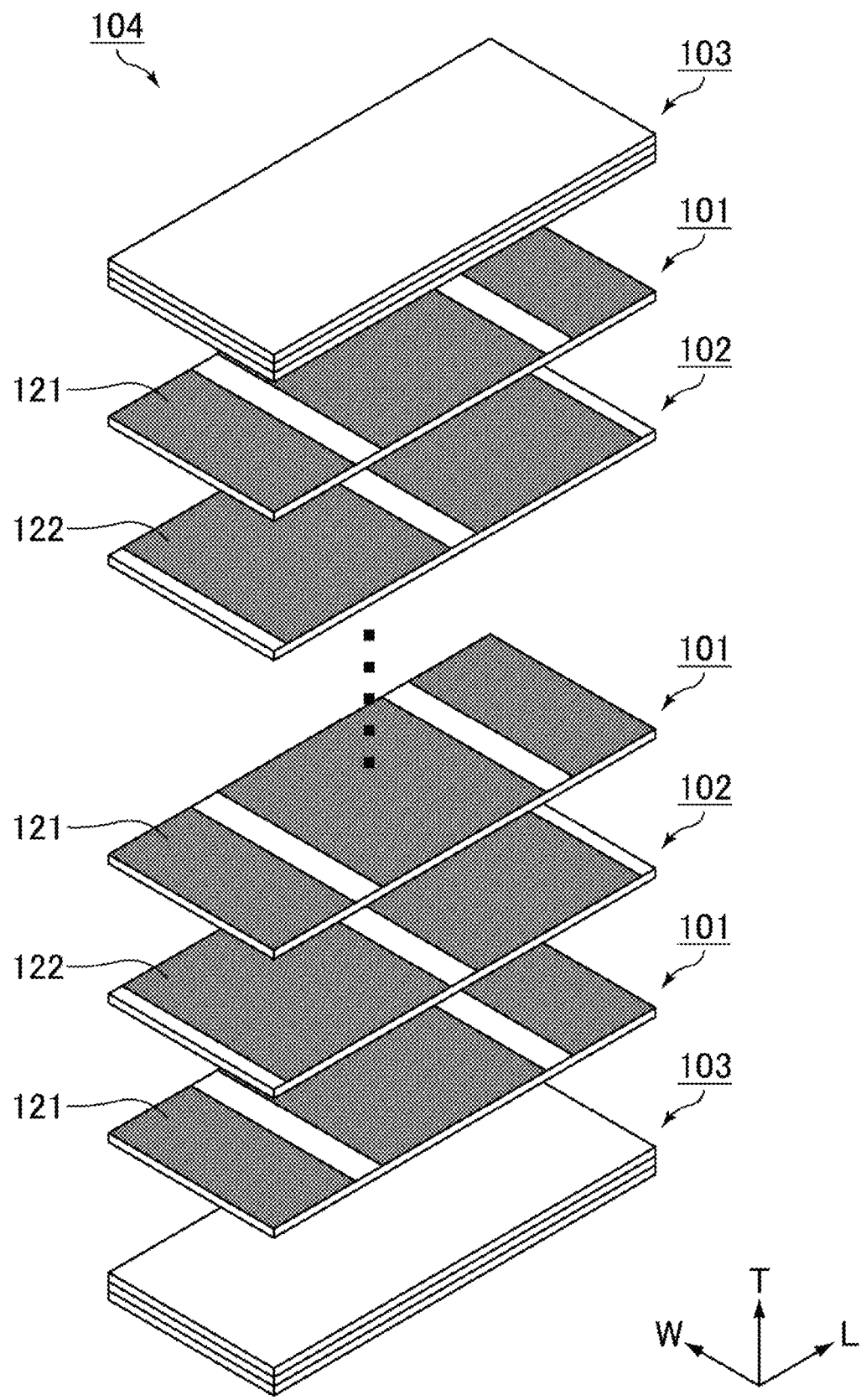
FIG. 7 is an exploded perspective view schematically showing an example of a mother block according to a preferred embodiment of the present invention.

FIG. 7 is an exploded perspective view schematically showing an example of a mother block.

In FIG. 7, for convenience of explanation, the first ceramic green sheet 101, the second ceramic green sheet 102, and the third ceramic green sheet 103 are shown disassembled. In an actual mother block 104, the first ceramic green sheet 101, the second ceramic green sheet 102 and the third ceramic green sheet 103 are pressure-bonded and integrated by an isostatic press, for example.

In the mother block 104 shown in FIG. 7, the first ceramic green sheets 101 and the second ceramic green sheets 102 corresponding to the inner layer portion 30 are alternately laminated in the lamination (T) direction. Furthermore, third ceramic green sheets 103 corresponding to the outer layer portions 31 and 32 are laminated on upper and lower surfaces of the first ceramic green sheets 101 and the second ceramic green sheets 102 laminated alternately in the lamination (T) direction. In FIG. 7, three third ceramic green sheets 103 are laminated, but the number of third ceramic green sheets 103 can be changed as appropriate.

A plurality of green chips are fabricated by cutting the obtained mother block 104 along cutting lines X and Y (see FIGS. 6A to 6C). For this cutting, for example, a method such as cutting with a dicing machine, push-cutting, laser cutting or the like is applied.

Figure 8:
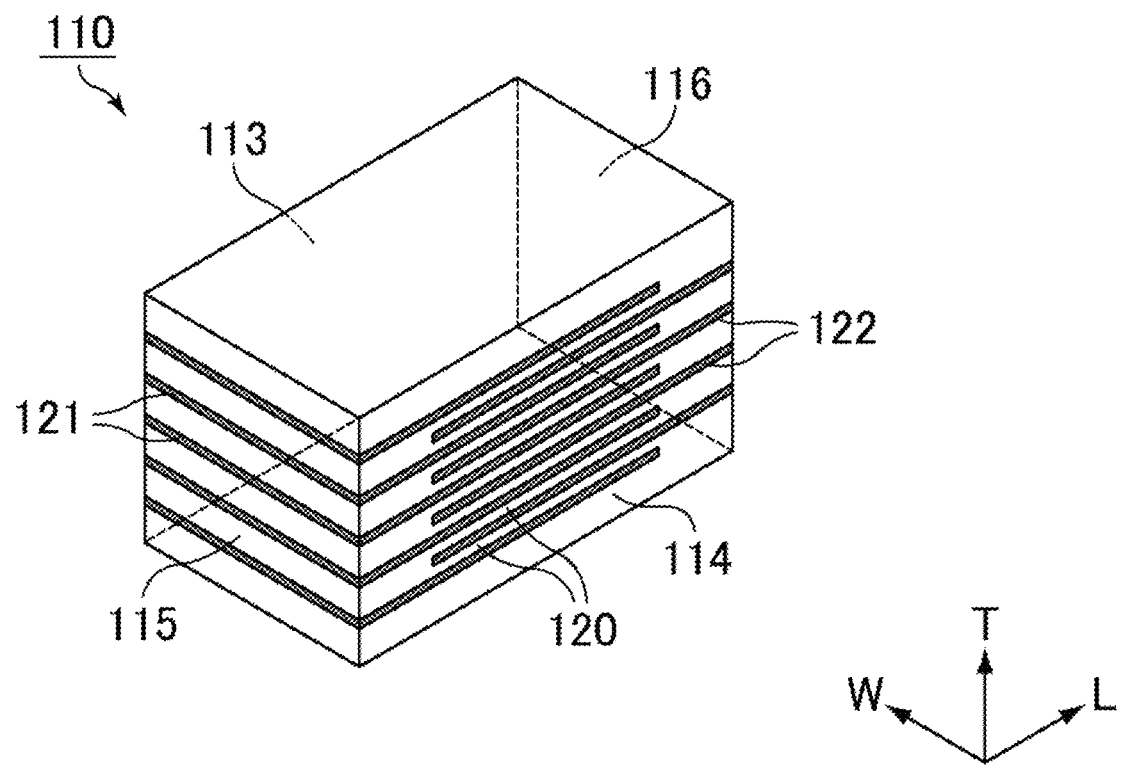
FIG. 8 is a perspective view schematically showing an example of a green chip according to a preferred embodiment of the present invention.

FIG. 8 is a perspective view schematically showing an example of a green chip.

A green chip 110 shown in FIG. 8 includes a laminated structure including a plurality of dielectric ceramic layers 120 in an unfired state, and a plurality of pairs of first internal electrode layers 121 and second internal electrode layers 122. A first side surface 113 and a second side surface 114 of the green chip 110 are surfaces defined by a cut along the cutting line X, and a first end surface 115 and a second end surface 116 are surfaces defined by a cut along the cutting line Y. The first internal electrode layer 121 and the second internal electrode layer 122 are exposed at the first side surface 113 and the second side surface 114. Further, only the first internal electrode layer 121 is exposed at the first end surface 115, and only the second internal electrode layer 122 is exposed at the second end surface 116.

An unfired laminated body is produced by forming an unfired side margin portion on the first side surface 113 and the second side surface 114 of the obtained green chip 110. For example, when the side margin portion includes two layers of an inner layer and an outer layer, the unfired side margin portion is formed by applying the inner layer ceramic slurry to the first side surface and the second side surface of the green chip, drying the inner layer ceramic slurry to form the unfired inner layer, and then attaching the outer layer ceramic green sheet to the surface of this inner layer to form an unfired outer layer.

For example, when the side margin portion includes two layers of an inner layer and an outer layer, first, a ceramic slurry including a binder, a solvent and the like in addition to a ceramic raw material including a dielectric ceramic material mainly including $BaTiO_3$ or the like is produced. A sintering aid may be added to the inner layer ceramic slurry. The inner layer has a role to adhere to the green chip 110.

In order to facilitate entry of the inner layer between the first internal electrode layer and the second internal electrode layer adjacent to each other in the lamination direction at the time of firing, glass is preferably added to the inner layer ceramic slurry. Further, in order to facilitate the entry between the first internal electrode layer and the second internal electrode layer in the state of slurry, it is preferable that a surfactant is added to the inner layer ceramic slurry.

Next, in order to produce an outer layer ceramic green sheet, a ceramic slurry including a binder, a solvent, and the like in addition to a ceramic raw material including a dielectric ceramic material including $BaTiO_3$ and the like as a main component is produced. It is preferable that a sintering aid is added to the outer layer ceramic slurry.

The outer layer ceramic slurry is applied to the surface of the resin film and dried to form the outer layer ceramic green sheet.

Thereafter, the outer layer ceramic green sheet is peeled off from the resin film.

Subsequently, the first end surface 115 and the second end surface 116 of the green chip 110 are masked with a resin or the like, and the entire green chip is dipped in the inner layer ceramic slurry and dried. As a result, the inner layer is formed on the first side surface 113 and the second side surface of the green chip 110. In this case, the inner layer is also formed on the outer layer portion. Thereafter, the outer layer ceramic green sheet and the inner layer of the green chip 110 on the first side surface 113 side are made to oppose each other, pressed and punched out, thus forming the unfired side margin portion 41 in which the outer layer is formed on the surface of the inner layer. Furthermore, the inner layer of the green chip 110 on the second side surface 114 side and the outer layer ceramic green sheet are made to oppose each other, pressed and punched out, thus forming the unfired side margin portion 42 in which the outer layer is formed on the surface of the inner layer. At this time, it is preferable to apply in advance an organic solvent as an adhesive to the surface of the inner layer after drying.

The inner layer ceramic slurry is applied to the first side surface 113 and the second side surface 114 of the green chip 110, dried, and then, the outer layer ceramic green sheet may be attached to the surface of the inner layer.

Figure 9:
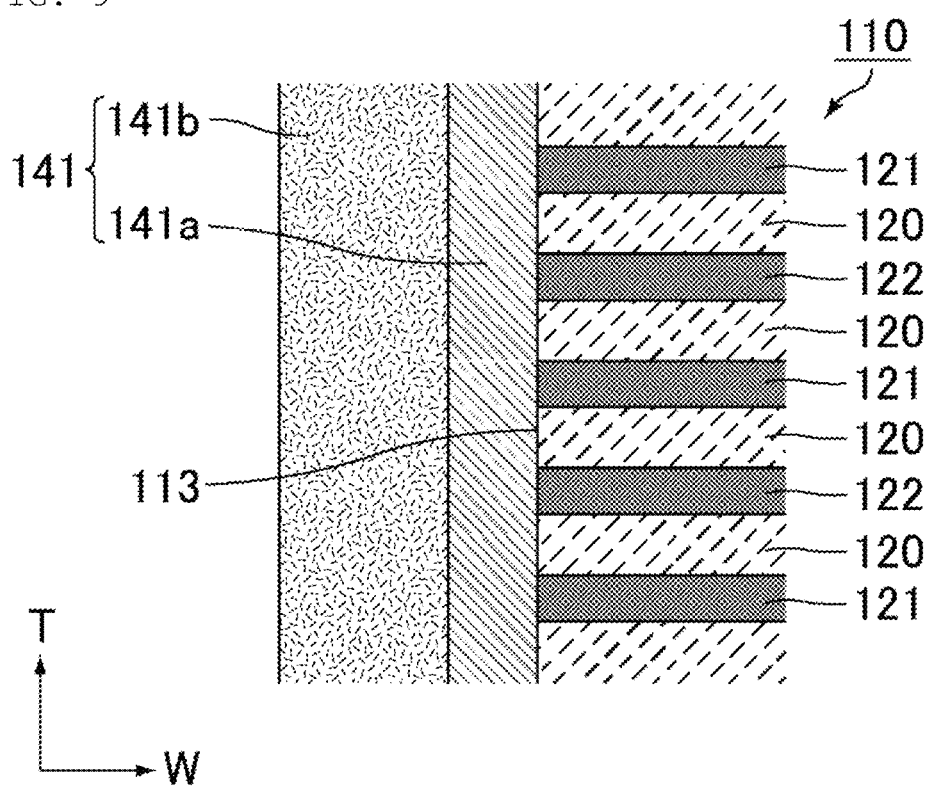
FIG. 9 is an enlarged sectional view schematically showing an example of a green chip according to a preferred embodiment of the present invention in which an unfired side margin portion is formed.

FIG. 9 is an enlarged sectional view schematically showing an example of a green chip in which the unfired side margin portions is formed.

In FIG. 9, an unfired inner layer 141a is formed on the first side surface 113 of the green chip 110, and an unfired outer layer 141b is formed on the surface of the unfired inner layer 141a, so that an unfired side margin portion 141 to be the side margin portion 41 is formed. In FIG. 9, the positions of the end surfaces of the first internal electrode layers 121 and the second internal electrode layers 122 on the first side surface 113 side of the green chip 110 are the same or substantially the same as the position of the end surfaces of the dielectric ceramic layers 120.

In this case, the unfired inner layer is also formed on the second side surface 114 of the green chip 110, and the unfired outer layer is formed on the surface of the unfired inner layer, so that an unfired side margin portion 142 to be the side margin portion 42 is formed. The positions of the end surfaces of the first internal electrode layers 121 and the second internal electrode layers 122 on the second side surface 114 side of the green chip 110 are the same or substantially the same as the position of the end surfaces of the dielectric ceramic layers 120.

Figure 10:
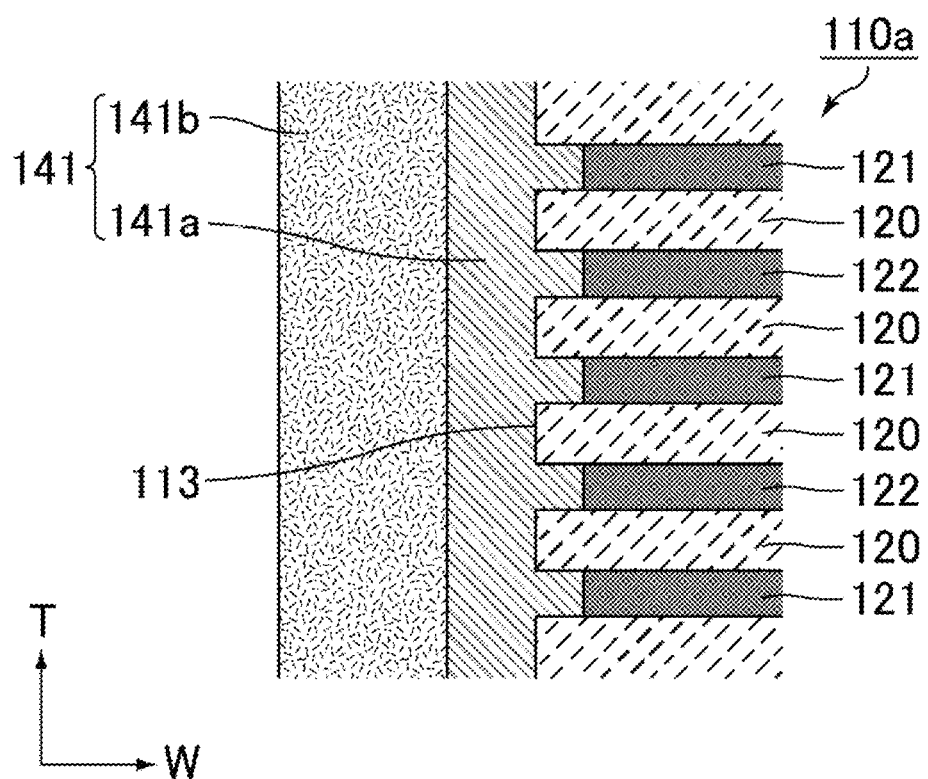
FIG. 10 is an enlarged cross-sectional view schematically showing another example of a green chip according to a preferred embodiment of the present invention in which an unfired side margin portion is formed.

FIG. 10 is an enlarged sectional view schematically showing another example of the green chip in which the unfired side margin portion is formed.

In FIG. 10, as in FIG. 9, the unfired inner layer 141a is formed on the first side surface 113 of a green chip 110a, and the unfired outer layer 141b is formed on the surface of the unfired inner layer 141a, so that the unfired side margin portion 141 to be the side margin portion 41 is formed. In FIG. 10, the end surfaces of the first internal electrode layers 121 and the second internal electrode layers 122 are positioned inside relative to the end surfaces of the dielectric ceramic layers 120 on the first side surface 113 side of the green chip 110a.

In this case, the unfired inner layer is also formed on the second side surface 114 of the green chip 110a, and the unfired outer layer is formed on the surface of the unfired inner layer, so that the unfired side margin portion 142 to be the side margin portion 42 is formed. The end surfaces of the first internal electrode layers 121 and the second internal electrode layers 122 are positioned inside relative to the end surfaces of the dielectric ceramic layers 120 on the second side surface 114 side of the green chip 110a.

As shown in FIG. 10, even when the end surfaces of the first internal electrode layers and the second internal electrode layers are positioned inside relative to the end surface of the dielectric ceramic layers in the unfired state, by applying the inner layer ceramic slurry to the side surface of the green chip, the inner layer ceramic slurry can be introduced between the first internal electrode layers and the second internal electrode layers adjacent in the lamination direction. As a result, a void is less likely to be generated between the first internal electrode layers or the second internal electrode layers and the inner layer after firing, and the moisture resistance reliability can be further improved.

The green chip 110 on which the unfired side margin portions 41 and 42 are formed is degreased in a nitrogen atmosphere under predetermined conditions, for example, and then fired at a predetermined temperature in a nitrogen-hydrogen-water vapor mixed atmosphere. As a result, the sintered laminated body (see FIG. 2) is obtained.

As described above, when the first internal electrode layers and the second internal electrode layers are balled during firing, the end surfaces of the first internal electrode layers 21 and the second internal electrode layers 22 after firing are positioned inside relative to of the end surface of the dielectric ceramic layers 20. However, the inner layer ceramic paste follows the surfaces and the inner layers 41a and 42a are interposed between the first internal electrode layers 21 and the second internal electrode layers 22 adjacent in the lamination direction. As a result, the structure shown in FIG. 5 is obtained.

An external electrode paste mainly including Cu is applied to each of the first end surface 15 and the second end surface 16 of the obtained laminated body 10 and fired, and a base electrode layer connected to the first internal electrode layers 21 and a base electrode layer connected to the second internal electrode layers 22 are formed. Furthermore, a first plating layer by Ni plating is formed on the surface of each base electrode layer, and a second plating layer by Sn plating is formed on the surface of the first plating layer. As a result, the first external electrode 51 and the second external electrode 52 are formed.

As described above, the multilayer ceramic capacitor 1 shown in FIG. 1 is manufactured.

The unfired outer layer may be formed by attaching the outer layer ceramic green sheet to the surface of the unfired inner layer, or may be formed by applying the outer layer ceramic slurry.

When forming an unfired outer layer by applying an outer layer ceramic slurry, the outer layer ceramic slurry is applied to the surface of the unfired inner layer and dried.

The unfired outer layer may be formed by masking both end surfaces of the green chip with a resin or the like, dipping the entire green chip in the outer layer ceramic slurry and drying it. In this case, the outer layer is also formed on the outer layer portion.

When the side margin portion includes a structure of three or more layers, the ceramic layer between the inner layer and the outer layer may be formed by attaching a ceramic green sheet for the ceramic layer, or applying the ceramic slurry for the ceramic layer.

The present invention is not limited to the above preferred embodiments, and various applications and modifications may be made within the scope of the present invention with regard to the configuration, manufacturing conditions, etc. of multilayer ceramic electronic components including the multilayer ceramic capacitor.

In the above-described preferred embodiments, after the mother block 104 is cut along the cutting lines X and Y to obtain a plurality of green chips, unfired side margin portions are preferably formed on both side surfaces of the green chip, but the preferred embodiment may be changed as follows.

That is, by cutting the mother block only along the cutting line X, a plurality of rod-shaped green block bodies in which the first internal electrode layers and the second internal electrode layers may be exposed on the side surface appearing by the cut along the cutting line X may be obtained, and after the unfired side margin portions on both side surfaces of the green block bodies may be formed, the portions may be cut along the cutting line Y to obtain a plurality of unfired laminated bodies. After that, the unfired laminated bodies may be fired. After firing, a multilayer ceramic electronic component, such as a multilayer ceramic capacitor, can be manufactured by performing the same or substantially the same process as that of the above-described preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a laminated body including a plurality of dielectric ceramic layers laminated in a lamination direction and a plurality of pairs of first internal electrode layers and second internal electrode layers, the laminated body including a first main surface and a second main surface opposing each other in the lamination direction, a first side surface and a second side surface opposing each other in a width direction orthogonal or substantially orthogonal to the lamination direction, and a first end surface and a second end surface opposing each other in a length direction orthogonal or substantially orthogonal to the lamination direction and the width direction;
   a first external electrode provided on the first end surface of the laminated body, and connected to the first internal electrode layers at the first end surface; and
   a second external electrode provided on the second end surface of the laminated body, and connected to the second internal electrode layers at the second end surface; wherein
   the laminated body includes:
      an inner layer portion in which the first internal electrode layers and the second internal electrode layers oppose each other with the dielectric ceramic layers interposed therebetween;
      outer layer portions sandwiching the inner layer portion in the lamination direction; and
      side margin portions sandwiching the inner layer portion and the outer layer portions in the width direction;
   the side margin portions each include a plurality of ceramic layers laminated in the width direction, and each of the side margin portions includes an inner layer made of the ceramic layers on an innermost side of the laminated body in the width direction, and an outer layer made of the ceramic layers on an outermost side of the laminated body in the width direction; and
   when a cross section of the laminated body in the width direction and the lamination direction is viewed at at least one side surface, end surfaces of the first internal electrode layers and end surfaces of the second internal electrode layers are positioned inside relative to end surfaces of the dielectric ceramic layers, and the inner layer is interposed between the first internal electrode layers and the second internal electrode layers adjacent in the lamination direction.

2. The multilayer ceramic electronic component according to claim 1, wherein in the width direction, a distance from each end surface of the first internal electrode layers and the second internal electrode layers to the outer layer is about 15 µm or less.

3. The multilayer ceramic electronic component according to claim 2, wherein in the width direction, a distance from each end surface of the first internal electrode layers and the second internal electrode layers to each end surface of the dielectric ceramic layers is about 5 µm or less.

4. The multilayer ceramic electronic component according to claim 1, wherein the inner layer excluding a portion, which is interposed between the first internal electrode layers and the second internal electrode layers, is thinner than the outer layer.

5. The multilayer ceramic electronic component according to claim 1, wherein the outer layer has a content of a sintering aid element larger than a content of a sintering aid element of the inner layer.

6. The multilayer ceramic electronic component according to claim 1, wherein a composition of a ceramic defining each ceramic layer of the side margin portion is different from a composition of a ceramic defining the dielectric ceramic layers.

7. The multilayer ceramic electronic component according to claim 1, wherein
   each of the side margin portions includes two layers including the inner layer and the outer layer; and
   an average grain diameter of ceramic grains included in the inner layer is larger than an average grain diameter of ceramic grains included in the outer layer and an average grain diameter of ceramic grains included in the dielectric ceramic layers.

8. The multilayer ceramic electronic component according to claim 1, wherein each of the first external electrode and the second external electrode has a multi-layer structure.

9. The multilayer ceramic electronic component according to claim 8, wherein the multi-layer structure includes an electrode layer and at least one plating layer.

10. The multilayer ceramic electronic component according to claim 1, wherein a total thickness of the outer layer portions is about 15 µm or more and about 40 µm or less.

11. The multilayer ceramic electronic component according to claim 1, wherein in the width direction, a total distance from the end surfaces of the first internal electrode layers to the end surfaces of the dielectric ceramic layers is equal or substantially equal to a total distance from the end surfaces of the second internal electrode layers to the end surfaces of the dielectric ceramic layers.

12. The multilayer ceramic electronic component according to claim 5, wherein
   the sintering aid element of the outer layer is one or more of Si, B, Li, K, Na, Mn, Mg, Ho, Ca, and V; and the sintering aid element of the inner layer is one or more of Si, B, Li, K, Na, Mn, Mg, Ho, Ca, and V.

* * * * *